United States Patent [19]

Seo

[11] Patent Number: 5,446,456

[45] Date of Patent: Aug. 29, 1995

[54] DIGITAL SIGNAL PROCESSING SYSTEM

[75] Inventor: Jin-gyo Seo, Kyungki-do, Rep. of Korea

[73] Assignee: Samsung Electronics Co., Ltd., Kyungki-do, Rep. of Korea

[21] Appl. No.: 175,279

[22] Filed: Dec. 29, 1993

[30] Foreign Application Priority Data

Apr. 30, 1993 [KR] Rep. of Korea .................. 93-7483

[51] Int. Cl.⁶ .............................................. H03M 1/06
[52] U.S. Cl. .................................................. 341/118
[58] Field of Search ..................... 341/118, 119, 94; 348/607, 603, 610; 371/31

[56] References Cited

U.S. PATENT DOCUMENTS

| | | | |
|---|---|---|---|
| 4,792,953 | 12/1988 | Pasdera et al. | 371/31 |
| 4,807,033 | 2/1989 | Keesen et al. | 348/607 |
| 5,243,428 | 9/1993 | Challapali et al. | 348/607 |

*Primary Examiner*—Brian K. Young
*Attorney, Agent, or Firm*—Leydig, Voit & Mayer

[57] ABSTRACT

A digital signal processing system error-correction-decodes received or reproduced data, and compensates the error-correction-decoded data according to an amount of motion which is generated between sequential frames, in order to restore the received or reproduced data into an original video signal. The digital signal processing system includes an error concealment unit which outputs a video signal of a current frame if the decoded data is error-corrected data, and substitutes the current frame data at the current frame position with the previous frame data at the position corresponding to the amount of motion if the decoded data is data of an area where the error is not corrected, thereby providing a high quality picture without degradation.

6 Claims, 4 Drawing Sheets

FIG. 5A
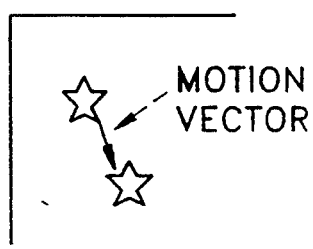
FIG. 5B
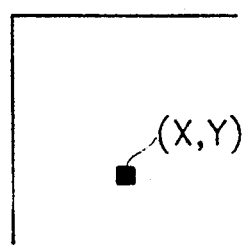
FIG. 5C
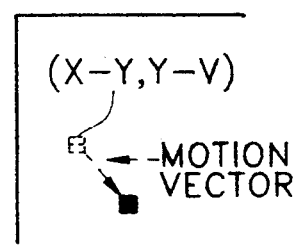
FIG. 7
1st LINE ——◆——◆——◆——
         YF[1]  YF[2]  YF[3]
2nd LINE ——◆——◆——◆——
         YG[1]  YG[2]  YG[3]
3rd LINE ——◆——◆——◆——
         YH[1]  YH[2]  YH[3]

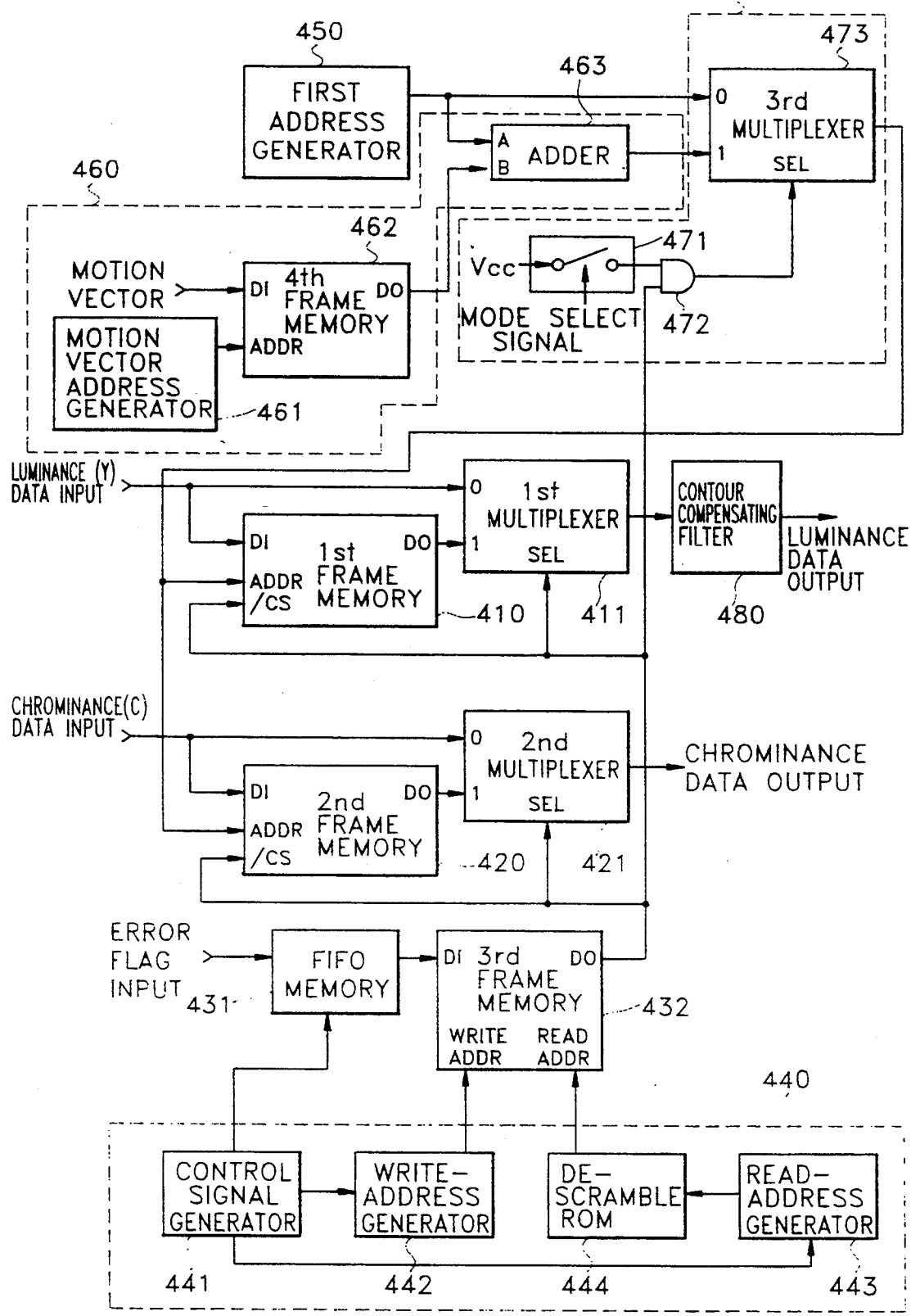

DIGITAL SIGNAL PROCESSING SYSTEM

BACKGROUND OF THE INVENTION

The present invention relates to a digital signal processing system, and more particularly to, a digital signal processing system for error correcting with respect to the moving image between continuous image frames, and replacing the image in the uncorrected region with the compensated preceding image signal, to thereby perform error concealment.

In general, the image data compression technique is considered the heart of image digital signal processing, whose application extends throughout the fields of picture conference systems, video telephones, multimedia, digital video cassette recorders and digital hi-definition television. In combination with the image data compression technique, many algorithms have been developed for transmitting or recording the best quality image within restricted channels.

For compressing the image data, a method is used whereby correlation which exists in the images is utilized to effectively reduce the amount of data. Particularly, "two-dimensional image compression" refers to the compression using the correlation within a frame, and "three-dimensional image compression" refers to compression using the correlation within one frame and between successive frames.

To use the two-dimensional correlation of images, a transmitting coding is generally used. Among many transmitting coding methods, a discrete cosine transform (DCT) method is the one most often used in recent years.

Meanwhile, the correlation between frames in the three-dimensional image compression is affected by the degree of motion belonging to the image. This motion is detected, and the image difference between frames which is extracted according to the detected motion, is encoded.

The digital image apparatus adopting these data compression techniques uses error correction and error concealment methods to prevent picture quality degradation due to errors generated in recording (or transmitting) and reproducing (or receiving).

Here, the error correction is to correct the errors included in the reproduced data (received data). For this end, error correction codes are utilized, and more particularly, the product code has been in a wide use for correcting the burst error.

Error concealment is to replace the image region which is not corrected even after performing error correction, with the image signal of the preceding field which does not have the error to thereby reduce the picture quality degradation.

FIG. 1 shows the conventional digital signal processing system established with the error correction and error concealment functions.

Error correction decoder 10 corrects the errors in the data transmitted from the recording or transmitting portion. Error correction decoder 10 includes an inner error correction decoder for correcting the errors which are within the correction capability and attaching an error flag to the errors which exceed the correction capability; a de-interleave processor for performing the de-interleave treatment on the interleave-processed data at the transmitting or recording side; and an outer error correction decoder for correcting again the data attached with the error flag among the output from the de-interleave processor, and, if the error is not yet corrected, attaching again the error flag to the error signal to be output.

Error correction techniques are disclosed in the Japanese Laid-open Patent Publication No. sho 64-30344 and Korean Patent Application No. 91-15248.

A data expander 20 expands the data being output from error correction decoder 10 to thereby restore the original signal. In addition to the compression structure (although not shown) of the transmitting or recording side, which includes a quantizer for performing DCT processing, a variable-length encoder and an error-correction encoder, the data expander further comprises a local decoder performing art inverse quantization and inverse DCT function, a frame memory, a motion predictor and a motion compensator for the utilization of the three-dimensional image correlation generated between frames, to thereby have a three-dimensional image compression structure.

As for the three-dimensional image compression structure, while the intra-frame processing is performed in order to code using the correlation within one frame, the local decoder stores intra-frame data to detect the motion of the succeeding frame.

Next, the frame data which is processed based on the inter-frame information and the preceding frame's data read out from the frame memory are compared with each other so that the motion between the two frames is detected. Also, the prediction data according to the detected motion is extracted from the motion compensator, so that the prediction error, which is the difference between the current frame data and the motion-compensated data, is DCT processed and encoded.

Accordingly, in the case of intra-frame decoding, data expander 20 performs the decoding by way of an error correction decoder, a variable-length decoder, an inverse quantizer, and inverse discrete cosine transform means. At this time, the intra-frame data is stored in the frame memory.

The ensuing inter-frame processing is for performing the motion compensation according to the motion vector decoded in the variable-length decoder, to thereby restore the prediction error after the inverse-discrete-cosine-transform processing.

Post processor 30 de-scrambles the scrambled data and changes the ratio of the luminance signal and color difference signals from 4:2:0 to 4:2:2. This is because, at the transmitting or recording side, the video signal having the ratio of 4:2:2 (for example, Y: 720 pels×480 lines, R−Y: 360 pels×480 lines, and B−Y: 360 pels×480 lines) is converted into video signal data having the ratio of 4:2:0 (for example, Y: 720 pels×480 lines. R−Y: 360 pels×240 lines, and B−Y: 360 pels×240 lines) via a pre-filter in the line sequence of vertical subsampling, and because the scrambling process is performed before the discrete cosine transform, to reconstruct the image so that the relatively consistent parts (those portions bearing little change in the image data) and changing parts (those portions bearing greater change in the image data) are spread uniformly.

Error concealer 40 restores the parts having the errors exceeding the error correction capability, by restoring the compressed picture image and using the picture information of the preceding frame.

A digital-to-analog (D/A) converter 50 converts the picture signal being output frown error concealer 40 into analog form, and thereby displays an analog picture signal on the display unit such as a monitor.

Here, the error concealer can further comprise a noise remover detecting the motion coefficient, i.e., the difference of image information between the current frame and the preceding frame, in the case of a motion picture, for outputting the output of error concealer 40, in the case of a still picture, for outputting the picture signal of the preceding frame, and, in the case of a picture having a certain degree of motions, for outputting as the picture signal the mixed signal of the current frame's picture signal and the preceding frame's picture signal.

FIG. 2 is a block diagram of the detailed error concealer shown in FIG. 1.

Referring to FIG. 2, the error concealer comprises a first frame memory 41 for storing the luminance signal of post processor 30 by frames: a second frame memory 42 for storing the chrominance signal of post processor 30 by frames; a first address generator 43 for generating the addresses of first and second frame memories 41 and 42; a first-in-first-out (FIFO) memory 46 for storing the error flag output from error correction decoder 10 by symbol in order to set the timing in accordance with the image data from post processor 30: a second address generator 47 for generating a de-scrambled error flag address; a third frame memory 48 for storing the error flag which is stored in FIFO memory 46 by frames according to the address generated by second address generator 47; and first and second multiplexers 44 and 45 for selecting the output of post processor 30 in accordance with the error-corrected region and selecting the image signal of the preceding frame stored in first and second frame memories 41 and 42 in accordance with the picture region where the error-correction has not been performed, according to the error flag signal being output from third frame memory 48, to thereby transmit the respective outputs to D/A converter 50.

As for the digital signal processing system shown in FIGS. 1 and 2, the error treatment is inevitable in the digital processing of the image signal. For performing such error treatment, error correction coding is utilized. However, the error portions, such as burst error, which cannot be corrected by the error correction decoder, will cause a significant degradation in the picture quality. Here, an error concealment is adopted to reduce the picture quality degradation. The conventional error concealment method is to merely perform replacement by borrowing data which corresponds to the error location in the current france (or field)from the stored, preceding frame (or preceding field) only.

Such a conventional method causes a picture quality degradation and makes an image bearing a greater degree of motion appear unnatural. Therefore, a more effective method for improving tile present problem becomes necessary.

For example, in a digital video cassette recorder having many reproducing methods such as normal playback, high-speed playback, and slow and still reproductions, when a picture signal is recorded in digital form, tile still and slow reproduction modes reproduce repetitive picture data (or stores the reproduced data in the memory and reads out the data to be processed), so that a picture is displayed on a screen.

Here, the reproduced data should be error-correction encoded. However, as for the portions in which the errors are not corrected, just the preceding frame's picture signal is restored at the error concealment process. Due to this, the picture signal of the preceding frame having the portions where the errors are not corrected, causes the succeeding pictures to have the same errors at the same positions, so that the picture quality is degraded. Accordingly, the original picture quality cannot be obtained.

SUMMARY OF THE INVENTION

To overcome the above-mentioned problem, it is an object of the present invention to provide a digital signal processing system for performing an error correction with respect to an image having motion, in that, after error correction, the data of the picture portion where the errors are not corrected is replaced with the data of the preceding frame which is motion-corrected, but not the data in the same location of the preceding field corresponding to the picture portion, to thereby reduce the picture quality degradation.

To accomplish the above object, the present invention provides a digital signal processing system which error-correction-decodes received or reproduced data, and compensates the error-correction-decoded data according to an amount of motion which is generated between sequential frames, in order to restore the received or reproduced data into an original video signal, the digital signal processing system comprising:

error concealment means which outputs a video signal of a current picture if the decoded data is error-corrected data, and substitutes the current picture data at the current picture position with the previous picture data at the position corresponding to the amount of motion if the decoded data is data of an area where the error is not corrected.

BRIEF DESCRIPTION OF THE DRAWINGS

The above objects and other advantages of the present invention will become more apparent by describing in detail a preferred embodiment thereof with reference to the attached drawings in which:

FIGS. 5A, 5B and 5C illustrate the principle of error concealment compensating the motion;

FIG. 6. is a detailed block diagram of the error concealer shown in FIG. 3; and

FIG.7 illustrates the operation principle of the contour compensating filter shown in FIG. 6.

DETAILED DESCRIPTION OF THE INVENTION

Figure 3:
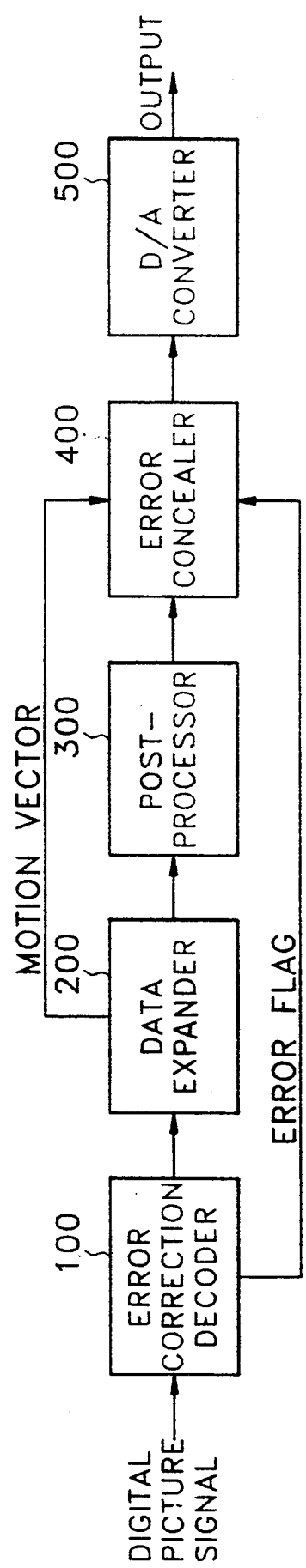
FIG. 3 is a block diagram showing a digital signal processing system according to an embodiment of the present invention.
Figure 2:
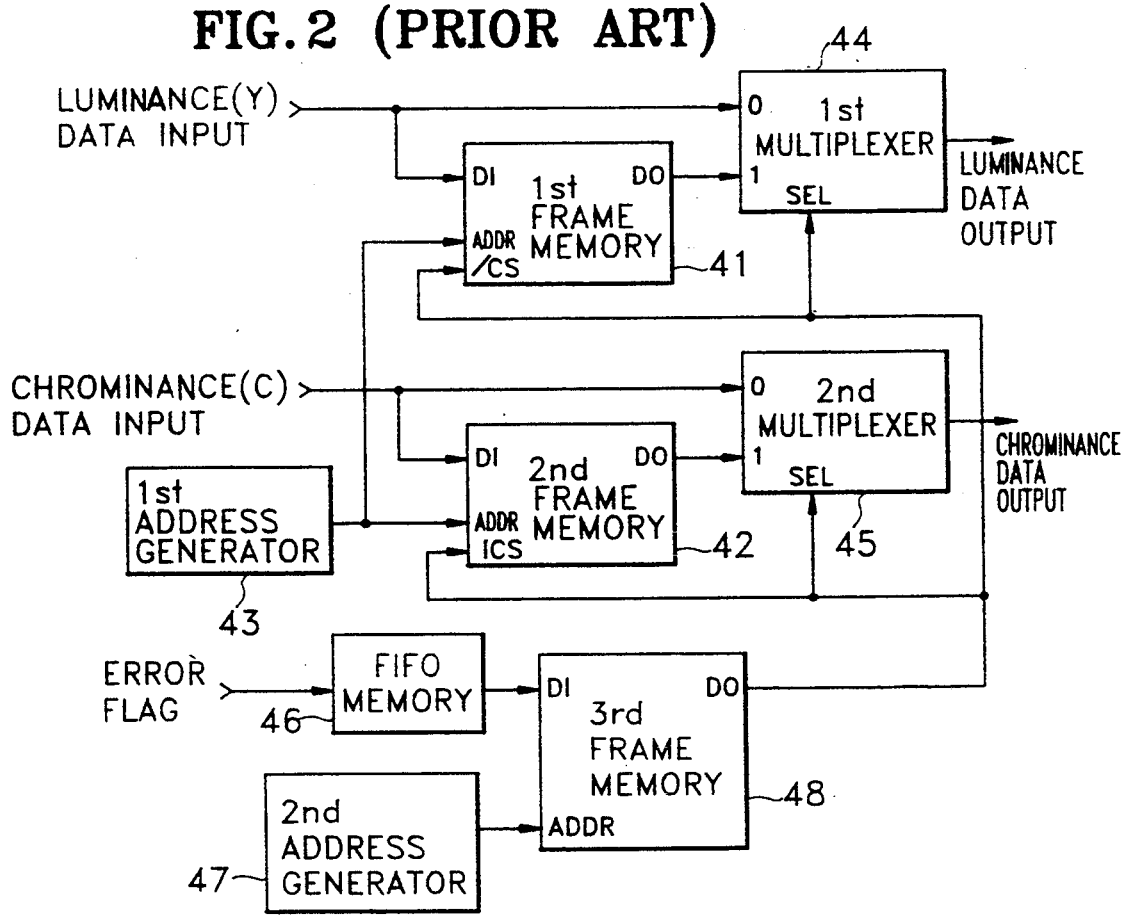
FIG. 2 is a detailed block diagram showing the error concealer of FIG. 1.

FIG. 3 is a block diagram of the digital signal processing system according to an embodiment of the present invention.

Figure 1:
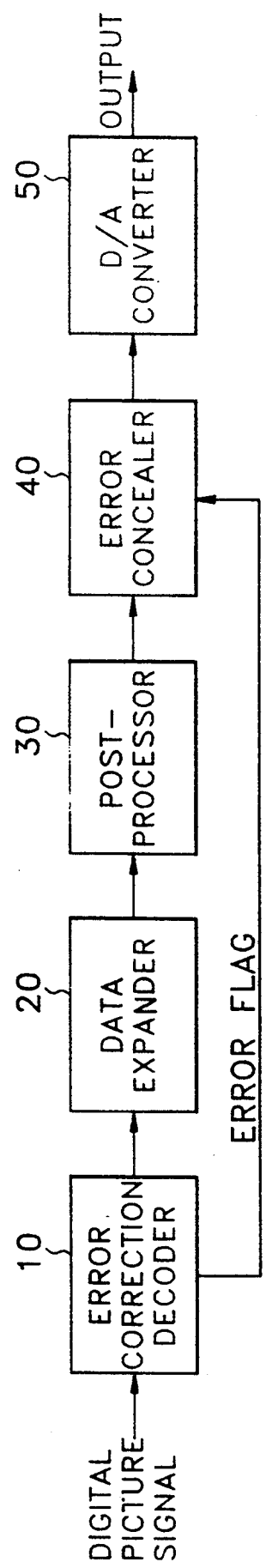
FIG. 1 is a block diagram showing the conventional digital signal processing system.

Referring to FIG. 3, in the construction of the digital signal processing system, an error correction decoder 100, a data expander 200, a post-processor 300 and a digital-to-analog (D/A) converter 500 are constructed the same as error correction decoder 10, data expander 20, post-processor 30 and D/A converter 50 of the digital signal processing system shown in FIG. 1. Meanwhile, an error concealer 400 receives the motion vector generated from data expander 200, and replaces the data of the portions which are not error-corrected with the data of the preceding frame in the location corresponding to the motion vector. Here, data expander 200 and post-processor 300 are called data restoring means.

The data compression technique for enhancing the data compression efficiency by detecting a motion vector is disclosed in U.S. Pat. Nos. 4,670,851 and 4,710,812.

Figure 4:
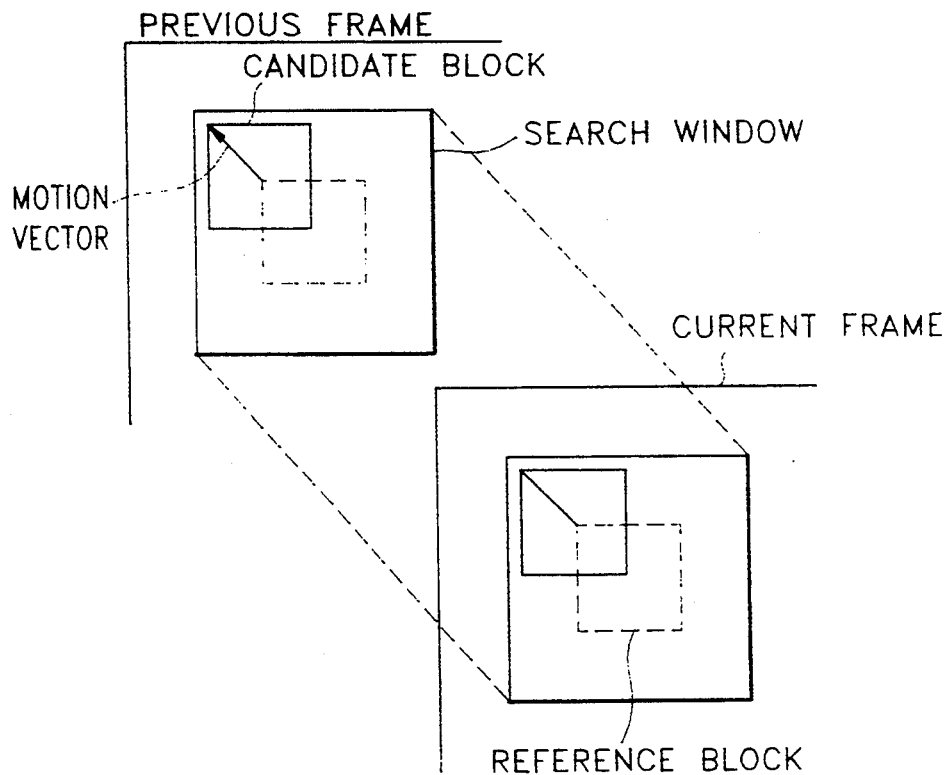
FIG. 4 illustrates a motion vector.

FIG. 4 illustrates the motion vector for better understanding of the present invention.

Many algorithms for detecting the motion generated in the continuous image interframes have been suggested in the field of the interframe prediction coding. However, a block matching method according to a full search of blocks is most often used.

The block matching method is, as shown in FIG. 4, used to match a predetermined block (reference block) of the present frame with each block of the preceding frame, centered on the block of the preceding frame having the same location with the predetermined block to thereby find the most similar block obtained via a limited search. Here, the degree of similarity has many diversified standards for the determination thereof. Among the many standards, the mean absolute error (MAE) is generally utilized for finding the predicted block. That is, many candidate blocks within a search window are compared with the reference block, so that the one having the least distortion becomes the predicted block. Also, the distance in the coordinates between the reference block position and the predicted block position becomes the motion vector.

A distortion relates to motion vector, and can be expressed as follows:

$$D_{i,j} = \sum_{m=1}^{M} \sum_{n=1}^{N} |X_{m,n} - Y_{m+i,n+j}|$$

where $D_{ij}$ is a distortion, X is a reference block, m is the row height, n is a column width and Y is a search window.

FIGS. 5A, 5B and 5C show the principle of the error concealment compensating the motion, for better understanding of the present invention. Here, FIG. 5A illustrates the motion vector generated by movement, FIG. 5B illustrates the occurrence of an error having not been corrected in the present frame, and FIG. 5C illustrates the data being replaced by compensating the movement at the preceding frame according to the error flag. Let the address of the present error location be (X,Y) and the motion vector be (H,V).

When the error occurs, the conventional error concealment method replaces the error with the data of location (X,Y) in the preceding frame. In reality, however, the error location data can be found in another location (X-H,Y-V) in the preceding frame.

Error concealer 400 of the present invention performs replacement using the data (X-H,Y-V) of the preceding frame, just before the motion is compensated, to thereby minimize the picture quality degradation.

The present invention will be described with emphasis on error concealer 400.

FIG. 6 shows a detailed circuit diagram of the error concealer shown in FIG. 3.

Data input ports (DI) of first and second frame memories 410 and 420 of error concealer 400 are connected to the output port of post-processor 300 shown in FIG. 3.

A first input port (0) of first multiplexer 411 is connected to the output port of post-processor 300 (FIG. 3), a second input port (1) thereof is connected to the data output port (DO) of first frame memory 410, and the output port thereof is connected to the input port of contour compensation filter 480 which is connected to D/A converter 500 (FIG. 3).

A first input port of second multiplexer 421 is connected to the output port of post-processor 300, a second input port thereof is connected to the data output port of second frame memory 420, and the output port thereof is connected to the input port of D/A converter 500.

The input port of FIFO memory 431 is connected to the output port of error correction decoder 100 shown in FIG. 3. The data input port of third frame memory 432 is connected to the output port of FIFO memory 430, and the data output port is connected to tile chip selection ports (/CS) of first and second frame memories 410 and 420, tile selection ports (SEL) of first and second multiplexers 411 and 421, and one input port of an AND gate 472, respectively.

The control signal output port of control signal generator 441 is connected to the control signal input ports of FIFO memory 43 1, write-address generator 442 and read-address generator 443. The address output port of write-address generator 442 is connected to write-address input port of third frame memory 432. Address input port of a de-scramble ROM 444 is connected to the address output port of read-address generator 443, and the output port thereof is connected to read-address input port of third frame memory 432. Here, control signal generator 441, write-address generator 442, read-address generator 443 and de-scramble ROM 444 constitute a third address generator 440.

The data input port of fourth frame memory 462 is connected to the output port of data expander 200 shown in FIG. 3, and address input port thereof is connected to the output port of a motion-vector address generator 461, respectively.

A first input port A of adder 463 is connected to the output port of first address generator 450, and a second input port B thereof is connected to the data output port of fourth frame memory 462, respectively. Here, motion-vector address generator 461, fourth frame memory 462 and adder 463 constitute second address generator 462. Here, adder 463 can be replaced with a subtracter.

The first input port of third multiplexer 473 is connected to the output port of first address generator 450, the second input port thereof is connected to the output port of adder 463, and the output port thereof is connected to the address input ports of first and second frame memories 410 and 420.

The other input port of AND gate 472 is connected to the output port of control switch 471 through which the mode selection control signal passes, and the output port thereof is connected to the selection port of third multiplexer 473. Control switch 471, AND gate 472 and third multiplexer 473 constitute a selecting portion 470.

Next, the operation of the system will be described in reference to FIG. 6.

Referring to FIG. 6, FIFO memory 431 stores the error flag generated and transmitted by symbols from error correction decoder 100, and delays the data which is decoded and sent from error correction decoder 100 by a predetermined time (here, 1 frame+1 clock period) so as to make the timing equal to the output data of data expander 200 and post-processor 300. Here, FIFO memory 431 operates as a delay, and the symbol unit which is composed of 255 bytes can be varied.

When the error flag is output from FIFO memory 431, third frame memory 432 converts the error flag (input by symbols) into FLU units. At this point, an FLU unit is a data processing unit for data expander 200 and is variably composed of 2550 bytes.

Since the maximum data processing unit of error correction decoder 100 and that of data expander 200 are different from each other, in order to match the output of FIFO memory 431 with the data processing unit of data expander 200, the data stored in FIFO memory 431 is transmitted to and stored in third frame memory 432 as in the data processing unit of data expander 200 whenever the frame reset signal appears from control signal generator 441.

Meanwhile, if third frame memory 432 has an error even in just one symbol of the data processing unit of data expander 200, the third frame memory outputs a new error flag so as to indicate that the error takes place sometime during the corresponding data processing period of data expander 200.

This is because the decoded data which is transmitted from error correction decoder 100 has a different form with respect to the data for use in error correction decoder 100. That is, error correction decoder 100 separately generates a signal suitable to the code length in use.

Thus, control signal generator 441 generates a control signal which is appropriate to the timing of the video data (the luminance and chrominance signals) supplied from post-processor 300, using a frame toggle signal transmitted from error correction decoder 100, and generates a frame reset signal which is appropriate to the control signal, so as to supply the generated signals to FIFO memory 431. Here, the frame toggle signal is a signal representing an intra-frame or a predicted frame. The "high" frame toggle signal represents the intra-frame and the "low" frame toggle signal represents the predicted frame.

To produce an error flag synchronized with the luminance and chrominance signal which are input to error concealment portion 400 in the previously de-scrambled state, the error flag needs to be de-scrambled.

Write address generator 442 generates an address as a signal having the FLU unit period using a drive clock of the incorporated counter (not shown), and the counter is cleared by a frame reset signal.

The row address generated from write address generator 442 has, for example, values of 0 to 21 while the column address has values of 0 to 29.

Read address generator 443 inputs the read address of third frame memory 432 to de-scramble ROM 444 and uses the output of de-scramble ROM 444 as a read address.

The output generated from read address generator 443 is used as the read address, in which the horizontal address represents the row address of the 8×8 block in the frame and has, for example, values of 0 to 87, while the vertical address represents the row address of the 8×8 block in the frame and has, for example, values of 0 to 29.

The horizontal address which is the output of de-scramble ROM 444 has values of 0 to 21, and the vertical address thereof has values of 0 to 29.

The horizontal and vertical addresses of de-scramble ROM 444 represent the position of the FLU where the block will belong after the block in the frame is converted into frame units and then the block is again scrambled.

On the other hand, first address generator 450 generates a frame memory address to store the video signal (the luminance and chrominance data) of the picture (here, in frame units) which is supplied from post-processor 300 in first and second frame memories 410 and 420. Also, first address generator 450 produces a write enable signal and a chip selection signal for controlling first and second frame memories 410 and 420. The write and read addresses are the same. Chip selection signal/CS becomes "high" at the position where the error is generated when the write enable signal is "low" using the error flag supplied from third frame memory 442. Accordingly, the write operation stops so that the video signal of the portion where the error is generated is not stored in first and second frame memories 410 and 420.

First and second frame memories 410 and 420 are the memories for storing the video signal (luminance and chrominance data) in frame units, in which the video signal having no error is stored and the error-generated video signal is not stored. By doing so, the video signal which is delayed by one frame and output from the memory is the previous frame video signal having no error.

First and second multiplexers 411 and 412 receives the error flag signal output from third frame memory 432 as a selection signal. Accordingly, first and second multiplexers 411 and 421 select the first selection terminal (0) when the error is not generated, to select the currently input/luminance and chrominance data. On the other hand, when the error is generated, the previous frame signals stored in first and second frame memories 410 and 420 are selected and output by selecting the second selection terminal (1).

Here, in order to correct the portion in which the error is not corrected from the motion picture signal, second address generator 460 is needed since the previous frame data should be output after compensating for the amount of motion.

Next, an operation of the invention will be described below on the basis of second address generator 460.

The motion vector being generated by data expander 200 is stored in fourth frame memory 462.

Motion vector address generator 461 generates, for example, horizontal addresses 0–87 and vertical addresses 0–59 to supply the generated addresses to fourth frame memory 462. The output of fourth frame memory 462 is an 8-bit signal of which the upper four bits are data with respect to the horizontal distance and the lower four bits are data with respect to the vertical distance. The uppermost bit of the respective four bits is stored as a sign bit. Thus, the motion vector of the respective four bits can represent a distance between −8 and 7.

Adder 463 adds the address output from fourth frame memory 462 to the current frame address generated from first address generator 450.

Thus, the output of adder 463 is an address with respect to the very position of the previous frame position in which the motion corresponding to the current position is compensated.

Third multiplexer 473 selects the output of first address generator 450 with respect to the video of the portion of which the error is corrected, while third multiplexer 473 selects the output of adder 463 with respect to the video of the portion of which the error is not corrected, in order to supply the selected signal as an address signal of first and second frame memories 410 and 420.

When a "high" signal (e.g., a power supply level Vcc) according to the selected motion video mode is supplied to AND gate 472 through a control switch 471, and simultaneously, when the error flag is generated from third frame memory 432, the output of AND gate 472 becomes "high." Accordingly, third multiplexer 473 selects the output of adder 463.

On the other hand, contour compensation filter 480 plays the role of reducing a block effect. When the video signal output from first multiplexer 411 is substituted with the previous frame video signal having no error, the block effect occurs due to the small degree of correlation with the adjacent video signal.

Here, the chrominance signal has a higher correlation with the adjacent video signal than with the luminance signal, and contour compensation filter 480 (a 3×3 filter) is adapted only with respect to the luminance signal. As shown in FIG. 7, as the operational principle of the 3×3 filter, the output YI[2] of contour compensation filter 480 can be represented as follows.

$$YI[2] = \frac{1}{16} (YF[1] + 2 \cdot YF[2] + YF[3] + 2 \cdot YG[1] +$$

$$4 \cdot YG[2] + 2 \cdot YG[3] + YH[1] + 2 \cdot YF[2] + YH[3])$$

Thus, the output of contour compensation filter 480 filters the contour portion of the area which is substituted with the previous frame data and smoothens the contour of the substituted area, thereby reducing the block effect.

The present invention can use a field memory instead of the frame memory.

As described above, the digital signal processing system according to the present invention performs error correction with respect to a video having motion. Thereafter, the present invention substitutes the video area of which the error is not error-corrected with the previous frame data of which the motion is compensated, but not the data of the same location of the preceding field corresponding to the picture portion. Accordingly, a high quality picture can be provided without degradation.

What is claimed is:

1. A digital signal processing system comprising:
    error-correction-decoder means for error-correction-decoding data for generating an error flag for errors beyond an error correction capability;
    data restoring means for compensating motion of the error-correction-decoded data according to a motion signal which is generated between sequential frames for restoring the error-correction-decoded data into an original video signal; and
    error concealment means for replacing a video signal for an area where the error is not corrected among the error-correction-decoded data with a previous frame video signal,
    wherein the error concealment means comprises:
        a first frame memory for storing luminance data output from the data restoring means in frame units;
        a second frame memory for storing color data output from the data restoring means in frame units;
        selection means for selecting outputs of the first and second frame memories or the data restoring means responsive to an error flag output from the error-correction-decoder means; and
        address generation means for generating an address obtained by adding a position corresponding to the motion signal to a current frame position or an address of the current frame position responsive to the error flag and for outputting the address generated as an address signal of the first and second frame memories.

2. The digital signal processing system according to claim 1 comprising a contour compensation filter for filtering a contour portion of the area substituted in order to reduce a block effect when the signal output from the selection means is substituted with the previous frame video signal.

3. The digital signal processing system according to claim 2 wherein the address generation means comprises:
    a first address generator for generating the addresses of the first and second frame memories;
    a second address generator for generating an address by adding an address of a position corresponding to the motion signal to an address of the current frame position generated in the first address generator; and
    an address selector for selecting an address generated in the first or second address generators responsive to the error flag and supplying an address selected as addresses of the first and second frame memories.

4. The digital signal processing system according to claim 3 wherein the second address generator comprises:
    a frame memory for storing the motion signal output from the data restoring means in frame units;
    an address generator for the motion signal which generates a write address and a read address of the frame memory; and
    an adder for adding an output of the first address generator to the output of the frame memory.

5. The digital signal processing system according to claim 4 wherein the address selector selects the output of the adder only when a current mode is a motion video mode and the error flag is generated.

6. A digital signal processing system comprising:
    an error correction decoder receiving digital picture data for error correcting the digital picture data, for outputting corrected data responsive to the error correcting, and for outputting an error flag when errors in the digital picture data cannot be corrected;
    a data restorer coupled to the error correction decoder for expanding and post processing the corrected data, for compensating the corrected data according to an amount of motion generated between sequential frames, for restoring the corrected data into video data, and for outputting a motion vector indicative of the amount of motion; and
    an error concealer coupled to the data restorer and to the error correction decoder for outputting the video data when the digital picture data corresponding to a current picture can be corrected, and for replacing the video data corresponding to the current picture at a current picture position with previous video data corresponding to the current picture position adjusted by the motion vector when an error is indicated by the error flag.

* * * * *